W. H. FAULKNER.
NUT LOCK.
APPLICATION FILED MAY 6, 1907.
937,295.
Patented Oct. 19, 1909.
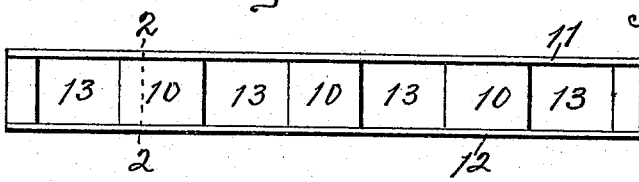 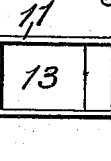  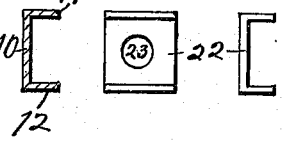
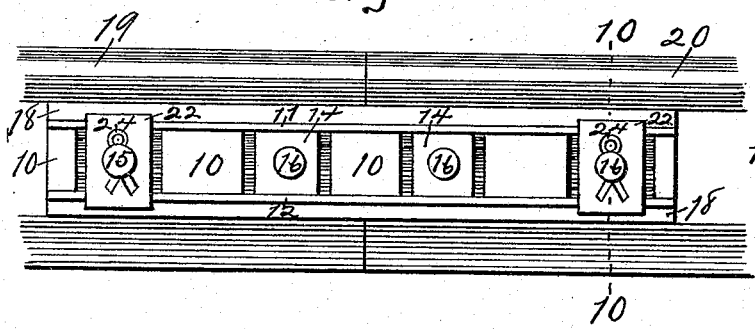 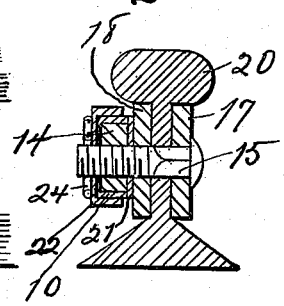
Attest:
E. W. Miller
H. G. Sweet.
Inventor:
William H. Faulkner,
By H. G. Sweet
Att'y

UNITED STATES PATENT OFFICE.

WILLIAM H. FAULKNER, OF DELTA, COLORADO.

NUT-LOCK.

937,295.  Specification of Letters Patent.  Patented Oct. 19, 1909.

Application filed May 6, 1907. Serial No. 372,619.

*To all whom it may concern:*

Be it known that I, WILLIAM H. FAULKNER, a citizen of the United States of America, and resident of Delta, Delta county, Colorado, (formerly of Fairfield, Jefferson county, Iowa,) have invented a new and useful Nut-Lock, of which the following is a specification.

The object of this invention is to provide improved means to prevent accidental rotation and loosening of a nut relative to a bolt.

A further object of this invention is to provide improved means for conjunctively preventing the rotation or loosening of a plurality of nuts relative to bolts carrying the same.

My invention consists in the construction, arrangement and combination of elements hereinafter set forth, pointed out in my claims and illustrated by the accompanying drawing, in which—

Figure 1 is a face view of one of my improved devices. Fig. 2 is a cross-section on the section line 2—2 of Fig. 1. Figs. 3 and 4 are face and end views respectively of a component part of my device. Fig. 5 is an elevation illustrating the manner of applying the device shown in Figs. 1, 2, 3 and 4 to a railway rail joint. Fig. 6 is a cross-section on the section line 10—10 of Fig. 5.

In the construction of the device as shown in Figs. 1, 2, 3, 4, 5 and 6, the numeral 10 designates a plate formed with flanges 11, 12 integral with its long side margins. The flanges 11, 12 are at right angles to the body of the plate 10 and of approximately the same width as the thickness of a nut to be locked by the device. A plurality of angular apertures 13 are formed in the plate 10 and extend approximately from flange to flange.

In Figs. 5 and 6 I have shown the plate 10 mounted on and embracing nuts 14, which nuts are screwed on bolts 15 and 16 employed to connect fishplates 17 and 18 to adjacent end portions of railway rails 19 and 20. Washers 21 are interposed between the nuts 14 and the adjacent fishplate 18. The plate 10 is mounted in contact with the washers 21 and the flanges 11, 12 on said plate engage upper and lower sides of the nuts 14 and prevent rotation of said nuts in either direction. Yokes 22 formed with central apertures 23 are mounted on extremities of the bolts 15 and overlap, embrace and engage end portions of the flanges 11, 12 of the plate 10. The yokes 22 are retained on the bolts 15 by keys 24 passed through the extremities of the bolts and engaging the outer faces of the yokes. It is the function of the yokes to prevent spreading of the flanges 11, 12 and, in conjunction with the keys 24, to retain the plate 10 in embracing engagement with the nuts 14.

I claim as my invention—

1. A nut lock, comprising a plate formed with flanges arranged parallel with each other on the long margins of said plate, said flanges at right angles to the body of the plate, said plate also formed with a plurality of apertures between said flanges and end to end throughout the length of the plate, and yokes separate from said plate and adapted to embrace said flanges.

2. The combination of bolts, nuts on said bolts, a plate formed with a plurality of apertures engaging said nuts, flanges on the long margins of said plate, said flanges of a width approximating to the thickness of said nuts and extending parallel with the sides of said nuts and in close proximity thereto, flanged yokes on said bolts engaging and embracing the flanges of said apertured plate, and keys mounted through said bolts and engaging said yokes.

Signed by me at Fairfield, Jefferson county, Iowa, this eighteenth day of December, 1906.

WILLIAM H. FAULKNER.

Witnesses:
HIRAM S. ANGSTEAN,
JOE S. CRAIL.